US008200279B2

United States Patent
Ki et al.

(10) Patent No.: US 8,200,279 B2
(45) Date of Patent: Jun. 12, 2012

(54) MOBILE TERMINAL FOR RECEIVING A KEY FOR BROADCAST CHANNELS

(75) Inventors: Jae Phil Ki, Seoul (KR); Gu Wan Jung, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 330 days.

(21) Appl. No.: 12/541,013

(22) Filed: Aug. 13, 2009

(65) Prior Publication Data

US 2010/0105430 A1  Apr. 29, 2010

(30) Foreign Application Priority Data

Oct. 29, 2008  (KR) .................. 10-2008-0106261

(51) Int. Cl.
*H04M 1/00* (2006.01)
(52) U.S. Cl. .................. 455/556.1; 370/399; 709/220; 709/222
(58) Field of Classification Search .............. 709/220, 709/222; 370/399; 455/556.1
See application file for complete search history.

(56) References Cited

U.S. PATENT DOCUMENTS

| 7,398,305 | B2 * | 7/2008 | Bodin et al. | 709/222 |
| 7,437,432 | B2 * | 10/2008 | Bodin et al. | 709/220 |
| 7,853,673 | B2 * | 12/2010 | Bodin et al. | 709/220 |
| 7,864,785 | B1 * | 1/2011 | Sitaraman et al. | 370/399 |
| 7,962,581 | B2 * | 6/2011 | Bodin et al. | 709/220 |

FOREIGN PATENT DOCUMENTS

| EP | 1 742 394 A2 | 1/2007 |
| GB | 2 407 947 A | 11/2005 |
| WO | 2005/045603 A2 | 5/2005 |
| WO | 2006/075900 A1 | 7/2006 |

OTHER PUBLICATIONS

Digital Video Broadcasting, "IPDC Over DVB-H: Electronic Service Guide (ESG) Implementation Guidelines", Mar. 2007.

* cited by examiner

*Primary Examiner* — William D Cumming
(74) *Attorney, Agent, or Firm* — Birch, Stewart, Kolasch & Birch, LLP

(57) ABSTRACT

A mobile terminal including a display unit, a user input unit, a wireless communication unit configured to receive bundle configuration information of a prescribed broadcast channel bundle, and a control unit configured to determine whether a configuration of the prescribed broadcast channel bundle is modified using the bundle configuration information, and to receive a key for broadcast channels of the configuration-modified broadcast channel bundle if the configuration of the broadcast channel bundle is modified.

22 Claims, 22 Drawing Sheets

FIG. 8

| CH1 | HBO | |
| CH2 | BBC | broadcast channel bundle (pay) |
| ⋮ | ⋮ | |
| CH9 | CNN | |
| CH10 | ESPN | |
| CH11 | MTV | pay broadcast channel |
| CH12 | OCN | pay broadcast channel |
| CH13 | NBC | free broadcast channel |
| CH14 | ABC | free broadcast channel |

(8-1)

| CH1 | HBO | |
| CH2 | BBC | broadcast channel bundle (pay) |
| ⋮ | ⋮ | |
| CH9 | CNN | |
| CH10 | ESPN | |
| (CH11) | MTV | |
| CH12 | OCN | pay broadcast channel |
| CH13 | NBC | free broadcast channel |
| CH14 | ABC | free broadcast channel |

(8-2)

| CH1 | HBO | |
| CH2 | BBC | broadcast channel bundle (pay) |
| ⋮ | ⋮ | |
| CH9 | CNN | |
| (CH10) | ESPN | pay broadcast channel |
| CH11 | MTV | pay broadcast channel |
| CH12 | OCN | pay broadcast channel |
| CH13 | NBC | free broadcast channel |
| CH14 | ABC | free broadcast channel |

(8-3)

FIG. 14
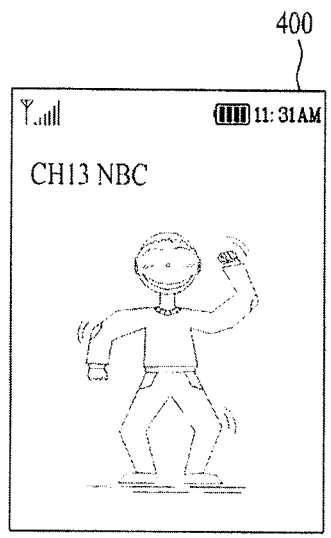
(14-1)
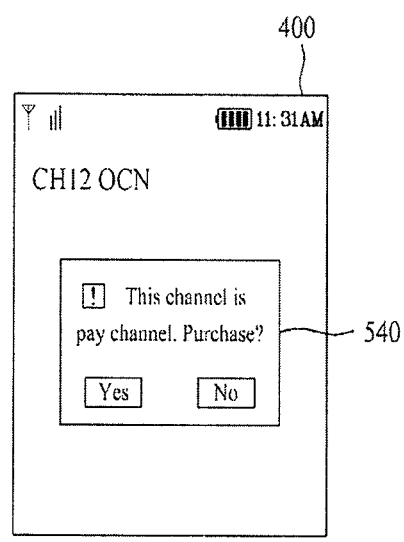
(14-2)
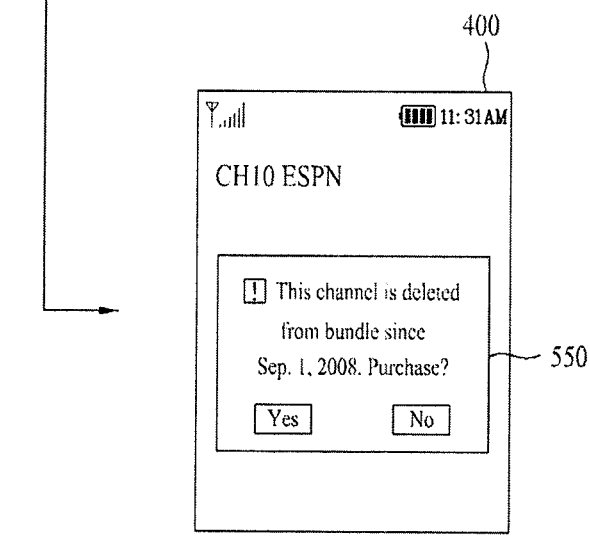
(14-3)

FIG. 15

| Name | Type | Category | Cardinality | Description |
|---|---|---|---|---|
| PrivateExt | E1 | NO/TO | 0..1 | Element playing a role as a container for extension |
| Update | E2 | NO/TO | 0..N | Service guide modification information included |
| FragmentType | A | | 1 | 0 – unspecified<br>1 – 'Service' Fragment<br>2 – 'Content' fragment<br>3 – 'Schedule' Fragment<br>4 – 'Access' Fragment<br>5 – 'PurchaseItem' Fragment<br>6 – 'PurchaseData' Fragment<br>7 – 'PurchaseChannel' Fragment<br>8 – 'PreviewData' Fragment<br>9 – 'InteractivityData' Fragment<br>10-127 – reserved for BCAST extensions<br>128-255 – available for proprietary extensions |
| UpdatedType | A | NO/TO | 1 | 0-Add<br>1-Delete<br>2-Change |
| id | A | NO/TO | 1 | Global ID of each fragment |
| Version | A | NO/TO | 1 | Fragment version. Terminal is able to determine whether to perform update by comparing it with a currently stored fragment version. |

FIG. 16

```xml
<?xml version="1.0" encoding="UTF-8"?>
<ServiceGuideDeliveryDescriptor xmlns="urn:oma:xml:bcast:sg:sgdd:1.0">
<BSMList>
<BSMSelector id="1421132">
<BSMFilterCode type="1">
<NetworkCode3GPP mobileCountryCode="262" mobileNetworkCode="02" />
</BSMFilterCode>
<Name xml:lang="ger" />
<Name xml:lang="eng">VF D</Name>
</BSMSelector>
</BSMList>
<DescriptorEntry>
<GroupingCriteria>
<TimeGroupingCriteria startTime="3432492280" endTime="3432513880" />
<BSMSelector idRef="1421132" />
<BSMSelector idRef="237827" />
</GroupingCriteria>
<Transport ipAddress="232.0.3.0" port="9004" srcIpAddress="10.17.85.5" transmissionSessionID="4" />
<ServiceGuideDeliveryUnit transportObjectID="16" contentLocation="urn:oma:bcast:sgduid:16">
<Fragment transportID="3558589" id="3558589" version="0" fragmentEncoding="1" />
<Fragment transportID="3560593" id="3560593" version="0" fragmentEncoding="1" />
</ServiceGuideDeliveryUnit>
</DescriptorEntry>
<PrivateExt>
<Update FragmentType="1" UpdatedType="0" id="11" Version="1"/>
<Update FragmentType="5" UpdatedType="1" id="10" Version="1"/>
</PrivateExt>
</<ServiceGuideDeliveryDescriptor>
```

FIG. 18
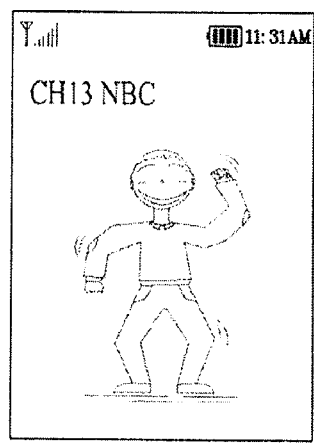
(18-1)
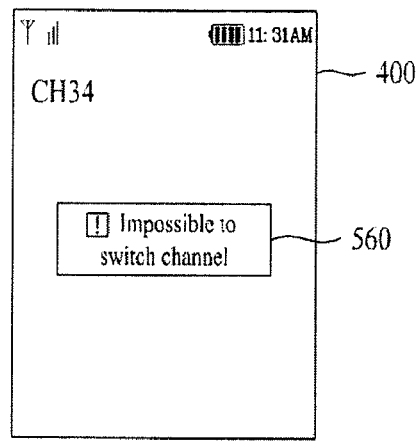
(18-2)
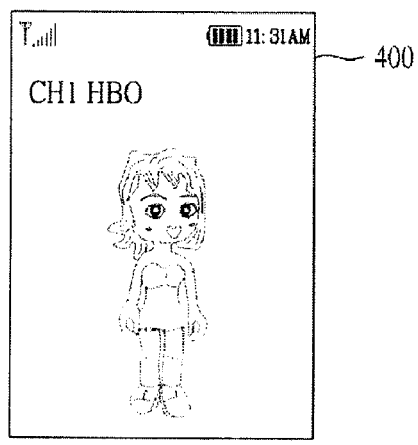
(18-3)
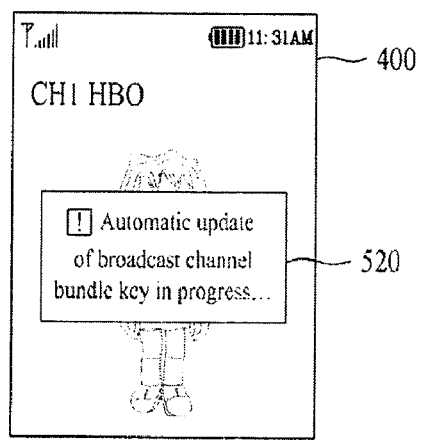
(18-4)

FIG. 21

| Name | Type | Category | Cardinality | Description |
|---|---|---|---|---|
| ServiceKey | E | NO/TO | O.,N | |
| ServiceId | A | NO/TO | 1 | Service ID for purchased channel |
| LTKM | E1 | NO/TO | 1 | SEK for purchased channel Encrypted with REK for DRM. Encrypted with SMK for SCP |

FIG. 22

```
<?xml version="1.0" encoding="UTF-8"?>

< ServiceKey ServiceId="5">
    <LTKM>alksdfhlksjdfh;lsdfkjgsdffsdlkjglksd</LTKM>
</ ServiceKey>
< ServiceKey ServiceId="6">
    <LTKM>alksdfhlksjdfh;lsdfkjgsdffsdlkjglksd</LTKM>
</ ServiceKey>
< ServiceKey ServiceId="7">
    <LTKM>alksdfhlksjdfh;lsdfkjgsdffsdlkjglksd</LTKM>
</ ServiceKey>
< ServiceKey ServiceId="8">
    <LTKM>alksdfhlksjdfh;lsdfkjgsdffsdlkjglksd</LTKM>
</ ServiceKey>
```

FIG. 23

| Name | Type | Category | 비고 | Description |
|---|---|---|---|---|
| ServiceKey | E | NO/TO | 1 | |
| ServiceId | A | NO/TO | O,N | Service for which update is necessary |

MOBILE TERMINAL FOR RECEIVING A KEY FOR BROADCAST CHANNELS

Pursuant to 35 U.S.C. §119(a), this application claims the benefit of the earlier filing date and right of priority to Korean Application No. 10-2008-0106261, filed on Oct. 29, 2008, the contents of which are hereby incorporated by reference herein in their entirety.

BACKGROUND OF THE INVENTION

1. Field of the Invention

The present invention relates to a mobile terminal and corresponding method for receiving a broadcast.

2. Discussion of the Related Art

Mobile terminal users can now view broadcast content on their terminal such as television programs, sport programs, etc. Some of the programs are free and some of the programs require payment. The broadcast content is also provided via the Internet or via a broadcast network. However, the broadcast features on the mobile terminal are limited in nature and thus are inconvenient for the user

SUMMARY OF THE INVENTION

Accordingly, one object of the present invention is to address the above-noted and other problems.

Another object of the present invention is to provide a mobile terminal and corresponding controlling method for making it easy for a user to view a specific one of a plurality of received broadcast channels.

To achieve these objects and other advantages and in accordance with the purpose of the invention, as embodied and broadly described herein, the present invention provides in one aspect a mobile terminal including a display unit, a user input unit, a wireless communication unit configured to receive bundle configuration information of a prescribed broadcast channel bundle, and a control unit configured to determine whether a configuration of the prescribed broadcast channel bundle is modified using the bundle configuration information, and to receive a key for broadcast channels of the configuration-modified broadcast channel bundle if the configuration of the broadcast channel bundle is modified.

In another aspect, the present invention provides a method of controlling a mobile terminal, and which includes receiving, via a wireless communication unit, bundle configuration information of a prescribed broadcast channel bundle, determining whether a configuration of the prescribed broadcast channel bundle is modified using the bundle configuration information, and receiving a key for broadcast channels of the configuration-modified broadcast channel bundle if the configuration of the broadcast channel bundle is modified.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram illustrating an example of broadcast channel configuration applicable to a method of controlling a mobile terminal according to the first embodiment of the present invention;

FIGS. 9 to 14 are overviews of display screens on which a method of controlling a mobile terminal according to the first embodiment of the present invention is implemented;

FIG. 15 is a diagram illustrating XML (extensible markup language) of a service guide according to OMA-BCAST system;

FIG. 16 is a diagram illustrating XML codes written according to the scheme of XML (extensible markup language) of the service guide shown in FIG. 15;

FIG. 18 is an overview of a display screen illustrating the method of controlling a mobile terminal according to the second embodiment of the present invention is implemented;

FIG. 21 is a diagram illustrating XML (extensible markup language) of a message for a purchase of an Internet broadcast channel bundle according to an embodiment of the present invention;

FIG. 22 is a diagram illustrating XML codes written according to the scheme of XML (extensible markup language) of the message shown in FIG. 21; and FIG. 23 is a diagram illustrating XML (extensible markup language) of a message for a purchase approval for an Internet broadcast channel bundle according to an embodiment of the present invention.

DETAILED DESCRIPTION OF THE INVENTION

Reference will now be made in detail to the preferred embodiments of the present invention, examples of which are illustrated in the accompanying drawings.

The present invention can be applicable to various types of terminals including stationary terminals and mobile terminals such as mobile phones, user equipment, smart phones, DTV, computers, digital broadcast terminals, personal digital assistants, portable multimedia players (PMP) and navigators. The following description refers to a mobile terminal 100, but embodiments of the present invention can also be applied to other types of terminals.

Figure 1:
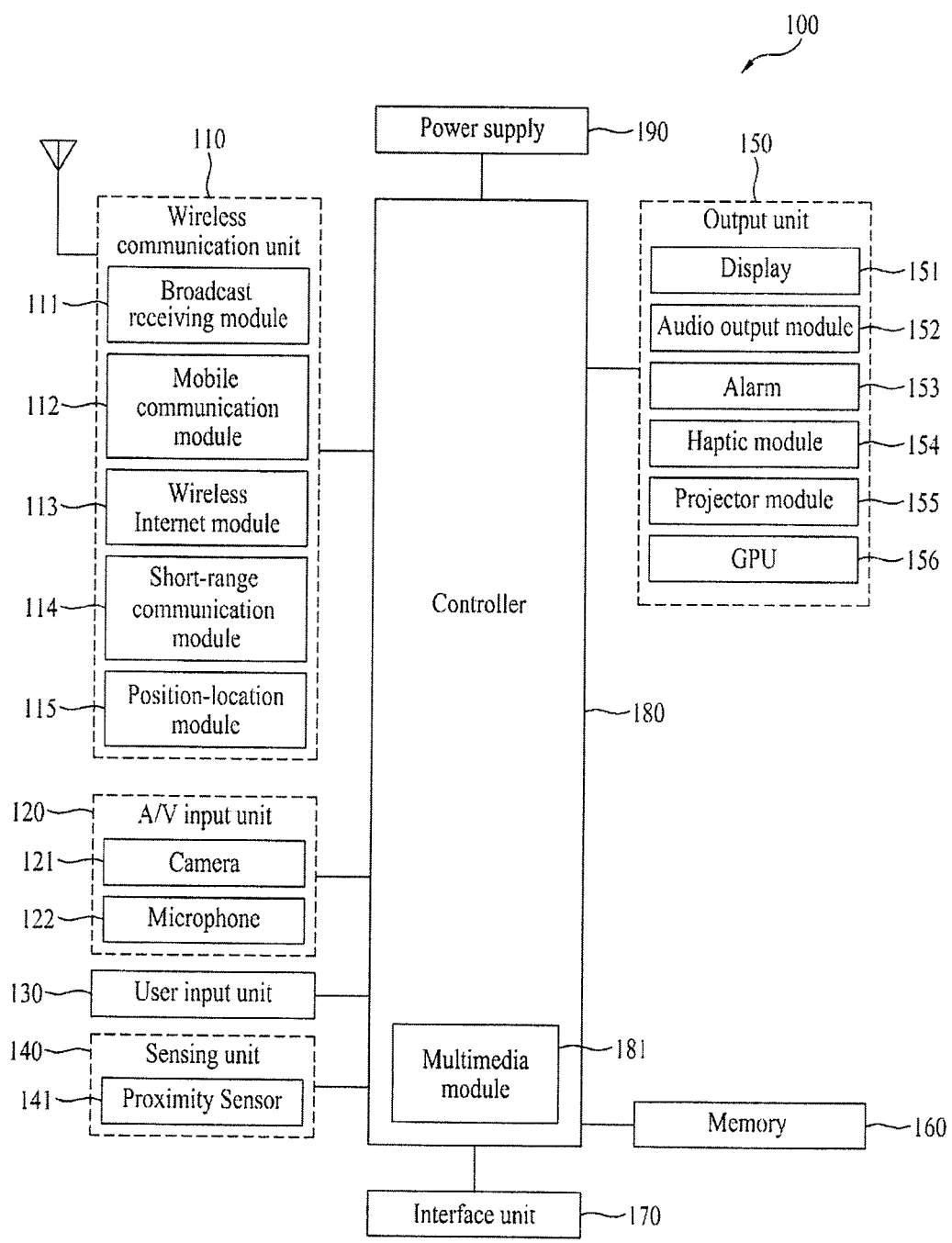
FIG. 1 is a block diagram of a mobile terminal according to an embodiment of the present invention.

FIG. 1 is a block diagram illustrating a mobile terminal 100 according to an embodiment of the present invention. As shown, the mobile terminal 100 includes a wireless communication unit 110 including one or more components which permit wireless communication between the mobile terminal 100 and a wireless communication system or network within which the mobile terminal is located. The wireless communication unit 110 can be replaced with a wire communication unit for non-wireless mobile terminals.

The wireless communication unit 110 also includes a broadcast receiving module 111 that receives a broadcast signal and/or broadcast associated information from an external broadcast managing entity via a broadcast channel such as a satellite channel and a terrestrial channel. The broadcast managing entity also refers to a system which transmits a broadcast signal and/or broadcast associated information. In addition, the mobile terminal 100 can include at least two broadcast receiving modules 111 for simultaneous reception of at least two broadcast channels or to facilitate broadcast channel switching.

Examples of broadcast associated information include information associated with a broadcast channel, a broadcast program, a broadcast service provider, etc. For example, the broadcast associated information may include an electronic program guide (EPG) of the digital multimedia broadcasting (DMB) system and an electronic service guide (ESG) of the digital video broadcast-handheld (DVB-H) system. The following embodiment refers to the broadcast associated information including a service guide as a non-limiting example.

Further, the broadcast signal may be implemented, for example, as a TV broadcast signal, a radio broadcast signal, and a data broadcast signal. The broadcast signal may also include a broadcast signal combined with a TV or radio broadcast signal. In addition, the broadcast receiving module 111 may be configured to receive broadcast signals transmitted from various types of broadcast systems including the digital multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the DVB-CBMS system, the OMA-BCAST system, the integrated services digital broadcast-terrestrial (ISDB-T) system, etc. Receiving multicast signals is also possible. Data received by the broadcast receiving module 111 can also be stored in a suitable device, such as a memory 160.

Also included is a mobile communication module 112 that communicates wireless signals with one or more network entities such as a base station or Node-B. Such signals may represent, for example, audio, video, multimedia, control signaling, and data. A wireless Internet module 113 supports Internet access for the mobile terminal 100 and may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless Internet module 113 can also be replaced with a wire Internet module in non-mobile terminals. The wireless Internet module 113 and wire Internet module may be commonly referred to as an Internet module.

The wireless communication unit 110 also includes a short-range communication module 114 that facilitates relatively short-range communications. Suitable technologies for short-range communication my include, but are not limited to, radio frequency identification (RFID), infrared data association (IrDA), ultra-wideband (UWB), as well as the networking technologies referred to as Bluetooth and ZigBee. In addition, a position-location module 115 identifies or otherwise obtains the location of the mobile terminal 100 and may be implemented using, for example, global positioning system (GPS) components which cooperate with associated satellites, network components, and combinations thereof.

According to the current technology, the module 115 can be a GPS module 115 that precisely calculates current 3-dimensional position information based on longitude, latitude and altitude by calculating distance information and precise time information from at least three satellites and then applying triangulation to the calculated information. Location and time informations can also be calculated using three satellites, and errors of the calculated location position and time informations can then amended using another satellite. The GPS module 115 is also able to calculate speed information by continuously calculating a real-time current location.

The mobile terminal 100 also includes an audio/video (A/V) input unit 120 configured to provide audio or video signal input to the mobile terminal 100. As shown, the A/V input unit 120 includes a camera 121 and a microphone 122. The camera 121 receives and processes image frames of still pictures or video, and the microphone 122 receives an external audio signal while the portable device is in a particular mode, such as phone call mode, recording mode or voice recognition mode. The audio signal is then processed and converted into digital data.

The portable device, and specifically the A/V input unit 120, can also include assorted noise removing algorithms to remove noise generated in the course of receiving the external audio signal. Data generated by the A/V input unit 120 may also be stored in the memory 160, utilized by the output unit 150, or transmitted via one or more modules of communication unit 110. Two or more microphones and/or cameras can also be provided.

In addition, a user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below. Further, a sensing unit 140 provides status measurements of various aspects of the mobile terminal 100. For example, the sensing unit 140 can detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal, etc.

If the mobile terminal 100 is configured as a slide-type mobile terminal, the sensing unit 140 can sense whether a sliding portion of the mobile terminal is opened or closed. Other examples include the sensing unit 140 sensing the presence or absence of power provided by the power supply 190, the presence or absence of a coupling or other connection between the interface unit 170 and an external device, etc. A proximity sensor 141 can also be included in the sensing unit 140.

The mobile terminal 100 also includes an interface unit 170 used to couple the mobile terminal 100 with external devices such as wired/wireless headphones, external chargers, power supplies, storage devices configured to store data such as audio, video, and pictures, as well as earphones and microphones. The interface unit 170 can also be configured using a wired/wireless data port, audio input/output ports, video input/output port, a card socket for coupling to a memory card, a subscriber identity module (SIM) card, a user identity module (UIM) card, or a removable user identity module (RUIM) card).

Also, when the mobile terminal 110 is connected to an external cradle, the interface unit 170 becomes a passage for supplying the mobile terminal 100 with power from the cradle or a passage for delivering various command signals input at the cradle by a user to the mobile terminal 100. Each of the various command signals input from the cradle or the power can operate as a signal enabling the mobile terminal 100 to recognize that it is correctly loaded in the cradle.

The mobile terminal 100 also includes an output unit 150 including various components that support the output requirements of the mobile terminal 100. For example, the output unit 150 includes a display 151 used to visually display information associated with the mobile terminal 100. For example, if the mobile terminal 100 is operating in a phone call mode, the display 150 can provide a user interface or graphical user interface that includes information associated with placing, conducting, and terminating a phone call. As another example, if the mobile terminal 100 is in a video call mode or a photographing mode, the display 151 can additionally or alternatively display images associated with these modes.

In addition, the display 151 can be configured as a touch screen working in cooperation with an input device, such as a touchpad. This configuration permits the display 151 to function both as an output device and an input device. Further, the display 151 may be implemented using known display technologies including a liquid crystal display (LCD), a thin film transistor-liquid crystal display (TFT-LCD), an organic light-emitting diode display (OLED), a flexible display and a three-dimensional display.

Further, some of the above displays can be configured to be transparent so that an external environment can be seen through the corresponding display. Such a display can be called a transparent display. A transparent LCD or TOLED is a representative example of the transparent display. The mobile terminal 100 can also include one or more displays 151. An example of a two-display embodiment is one in which one display 151 is configured as an internal display viewable when the terminal is in an opened position, and a second display 151 configured as an external display viewable in both the opened and closed positions. The touchscreen can also be configured to detect a touch input pressure as well as a touch input position and size.

In addition, the proximity sensor 141 can be provided within or around the touchscreen. The proximity sensor 141 detects an object approaching a prescribed detecting surface or a presence or non-presence of an object existing around itself using an electromagnetic power or infrared rays without mechanical contact. Thus, the proximity sensor 141 is generally superior to a contact sensor in lifespan and utilization. An example for an operational principle of the proximity sensor 141 is explained as follows. First, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. Thus, even if a material except a metallic material comes between the RF oscillation proximity sensor and the object, a proximity switch is able to detect the object to detect without interference with the material.

Further, if the touchscreen is electrostatic, the touchscreen can be configured to detect the proximity of a pointer through an electric field change attributed to the proximity of the pointer. Therefore, when the pointer is placed in the vicinity of the touchscreen without actually contacting the touchscreen, the position of the pointer and the distance between the pointer and the touchscreen can be detected. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. Also, a position at which the proximity touch is made to the touchscreen using the pointer corresponds to a position of the pointer vertically corresponding to the touchscreen when the pointer makes the proximity touch.

The proximity sensor 141 can also sense a proximity touch and its pattern (e.g., proximity touch distance, proximity touch direction, proximity touch speed, proximity touch position, proximity touch moving state, etc.). Thus, the sensor can output information corresponding to the sensed proximity touch action and the proximity touch pattern to the touchscreen.

FIG. 1 also shows the output unit 150 having an audio output module 152 which supports the audio output requirements of the mobile terminal 100. The audio output module 152 can be implemented using one or more speakers, buzzers, other audio producing devices, and combinations thereof. The audio output module 152 also functions in various modes such as a call-receiving mode, a call-placing mode, a recording mode, a voice recognition mode and a broadcast reception mode. During operation, the audio output module 152 outputs audio relating to a particular function or status, such as a call received, a message received, or errors.

The output unit 150 is further shown having an alarm 153, which can be used to signal or otherwise identify the occurrence of a particular event associated with the mobile terminal 100. Example events include a call received, a message received and a user input received. Further, an example of a signal provided by the output unit 150 is tactile sensations. Thus, the alarm 153 may be configured to vibrate responsive to the mobile terminal 100 receiving a call or message. As another example, vibration can be provided by the alarm 153 responsive to receiving user input at the mobile terminal 100, thereby providing a tactile feedback mechanism. The various signals provided by the components of output unit 150 may be separately performed or performed using any combination of such components.

In addition, as shown in FIG. 1, the output unit 150 also includes a haptic module 154 and a projector module 155. The haptic module 154 generates various tactile effects that can be sensed by a user. Vibration is a representative one of the various tactile effects generated by the haptic module 154. A strength and pattern of the vibration generated by the haptic module 154 can also be controlled an varied. For instance, different vibrations can be output in a manner of being synthesized together or can be outputted in sequence.

The haptic module 154 can also generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can also be implemented to enable a user to sense the tactile effect through a muscle sense of the finger, arm or the like as well as to transfer the tactile effect through a direct contact. At least two haptic modules 154 can also be provided to the mobile terminal 100. In addition, the projector module 155 performs an image projector function using the mobile terminal 100. In particular, the projector module 155 can display an image, which is identical to or partially different at least from the image displayed on the display 151, on an external surface such as a screen or wall according to a control signal of a controller 180.

In particular, the projector module 155 can include a light source generating light (e.g., laser) for projecting an image externally, an image producing mechanism for producing and outputting an image externally using the light generated from the light source, and a lens for enlarging and outputting the image externally in a predetermined focus distance. Further, the projector module 155 can also include an adjusting device for adjusting an image projected direction by mechanically moving the lens or the entire module.

In addition, the projector module 155 can be classified into a CRT (cathode ray tube) module, an LCD (liquid crystal display) module, a DLP (digital light processing) module or the like according to a display device type. In particular, the DLP module is operated by enabling the light generated from the light source to reflect on a DMD (digital micro-mirror device) chip and can advantageously downsize the projector module 151. The projector module 155 is also preferably provided in a length direction of a lateral, front or backside direction of the mobile terminal 100. However, the projector module 155 can be provided to any portion of the mobile terminal 100. A Graphics Processing Unit (GPU) 156 can also be included in the output unit 150.

Further, the memory 160 is used to store various types of data to support the processing, control, and storage requirements of the mobile terminal 100. Examples of such data include program instructions for applications operating on the mobile terminal 100, contact data, phonebook data, messages, pictures, and video. Moreover, a recent use history or a cumulative use frequency of each menu in the mobile terminal can be stored in the memory 160. In addition, data for various patterns of vibration and/or sound output when a touch input to the touchscreen can be stored in the memory 160.

A key for decoding an encrypted broadcast channel received via a broadcast network, a mobile communication network or a wireless Internet network can be stored in the memory 160. This will be explained in more detail later. In addition, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

Further, the controller 180 controls the overall operations of the mobile terminal 100. For example, the controller 180 performs the control and processing associated with voice calls, data communications, instant message communication, video calls, camera operations and recording operations. In FIG. 1, the controller 180 also includes a multimedia module 181 that provides multimedia playback. The multimedia module 181 may also be configured as part of the controller 180, or implemented as a separate component. Moreover, the controller 180 can perform a pattern recognizing process for recognizing a writing input and a picture drawing input performed on the touchscreen as characters or images, respectively.

The mobile terminal 100 also includes a power supply 190 that provides power required by the various components for the mobile terminal 100. The power may be internal power, external power, or combinations thereof. Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may also be implemented in a variety of different configurations. Examples of such configurations include folder-type, slide-type, bar-type, rotational-type, swing-type and combinations thereof. The following description refers to a slide-type mobile terminal 100. However, such teachings apply equally to other types of mobile terminals.

Figure 2:
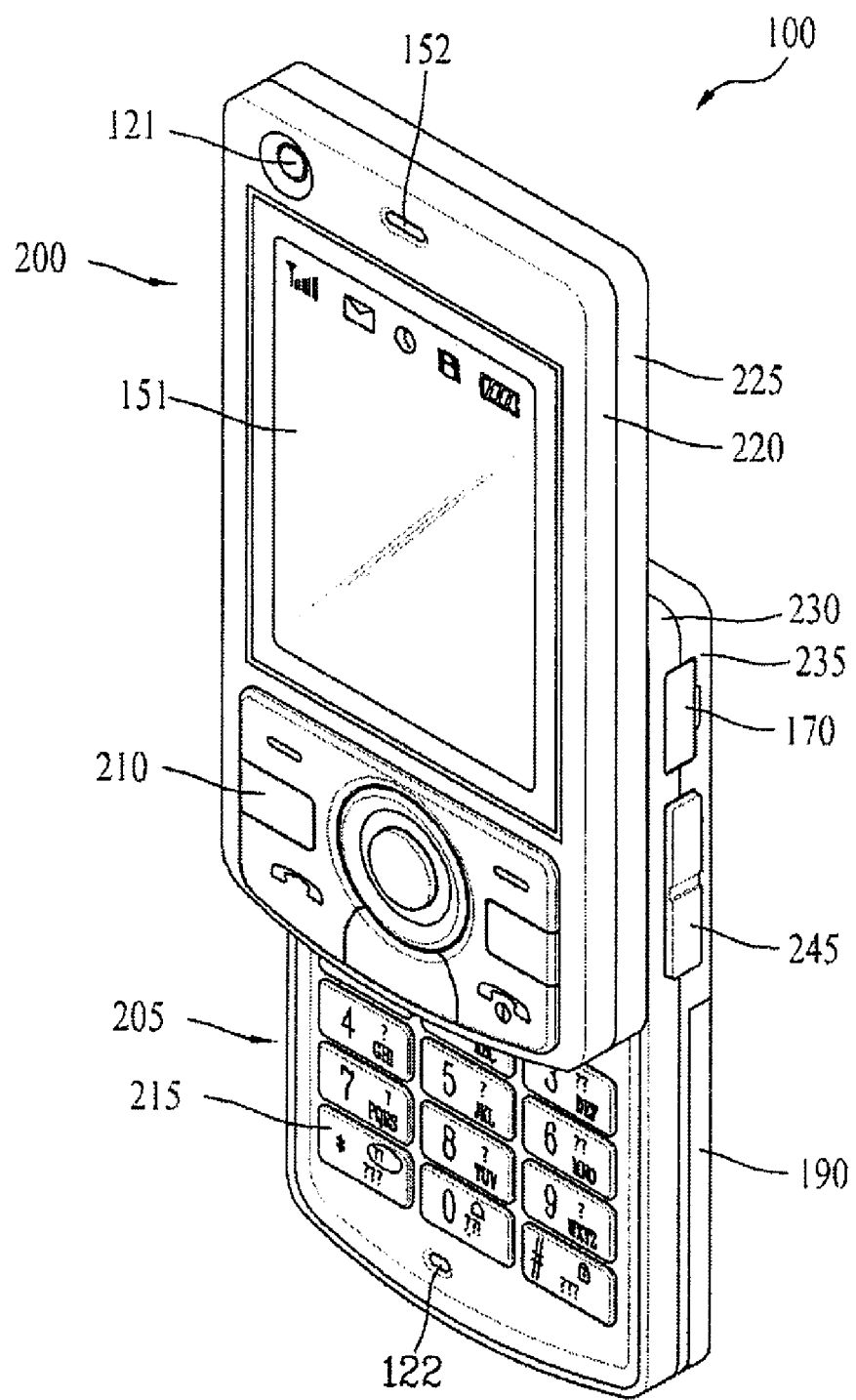
FIG. 2 is a front perspective diagram of a mobile terminal according to an embodiment of the present invention.

Next, FIG. 2 is a front perspective view of the mobile terminal 100 according to an embodiment of the present invention. In FIG. 2, the mobile terminal 100 is shown having a first body 200 configured to slidably cooperate with a second body 205. The user input unit 130 in FIG. 1 includes a first input unit such as function keys and four directional keys 210 (for example, navigation keys), a second input unit such as keypad 215 and a third input unit such as side keys 245. The function keys 210 are associated with the first body 200, and the keypad 215 is associated with the second body 205. In addition, the keypad 215 includes various keys such as numbers, characters, and symbols to enable a user to place a call, prepare a text or multimedia message, and otherwise operate the mobile terminal 100.

Further, the first body 200 slides relative to the second body 205 between opened and closed positions. Also, for a folder-type mobile terminal, a first body folds and unfolds relative to a second body between opened and closed positions. In addition, for a swing-type mobile terminal, a first body swings relative to a second body between opened and closed positions.

Also, in FIG. 2, the mobile terminal in a closed position includes the first body 200 positioned over the second body 205 in such a manner that the keypad 215 is substantially or completely obscured by the first body 200. In the opened position, the user can access the keypad 215. Further, the function keys 210 are conveniently configured for the user to enter commands such as start, stop and scroll.

The mobile terminal 100 is also operable in either a standby mode, in which it is able to receive a call or message and to receive and respond to network control signaling or an active call mode. Typically, the mobile terminal 100 functions in the standby mode in the closed position and in an active mode in the opened position. This mode configuration may be changed as required or desired.

Further, the first body 200 includes a first case 220 and a second case 225, and the second body 205 includes a first case 230 and a second case 235. The first case 230 and second case 235 can also be formed from a suitably rigid material such as an injection molded plastic, or be formed using a metallic material such as stainless steel (STS) and titanium (Ti). One or more intermediate cases may also be provided between the first case 230 and second case 235 of one or both of the first body 200 and second body 205. The first body 200 and second body 205 are also sized to receive electronic components used to support operation of the mobile terminal 100.

The first body 200 is also shown having the camera 121 and audio output unit 152, which is configured as a speaker, positioned relative to the display 151. The camera 121 may also be constructed such that it can be selectively positioned relative to first body 200 such as by rotation or swiveling. In addition, the function keys 210 are positioned adjacent to a lower side of the display 151, which is shown implemented as an LCD or OLED. The display 151 may also be configured as a touch screen having an underlying touchpad which generates signals responsive to user contact with the touchscreen such as with a finger or stylus.

In addition, the second body 205 is shown having the microphone 122 positioned adjacent to the keypad 215 and having the side keys 245, which are one type of a user input unit as mentioned above, positioned along the side of second body 205. The side keys 245 may also be configured as hot keys such that the side keys are associated with a particular function of the mobile terminal 100. The interface unit 170 is also shown positioned adjacent to the side keys 245, and the power supply 190 in a form of a battery is shown located on a lower portion of the second body 205.

Figure 3:
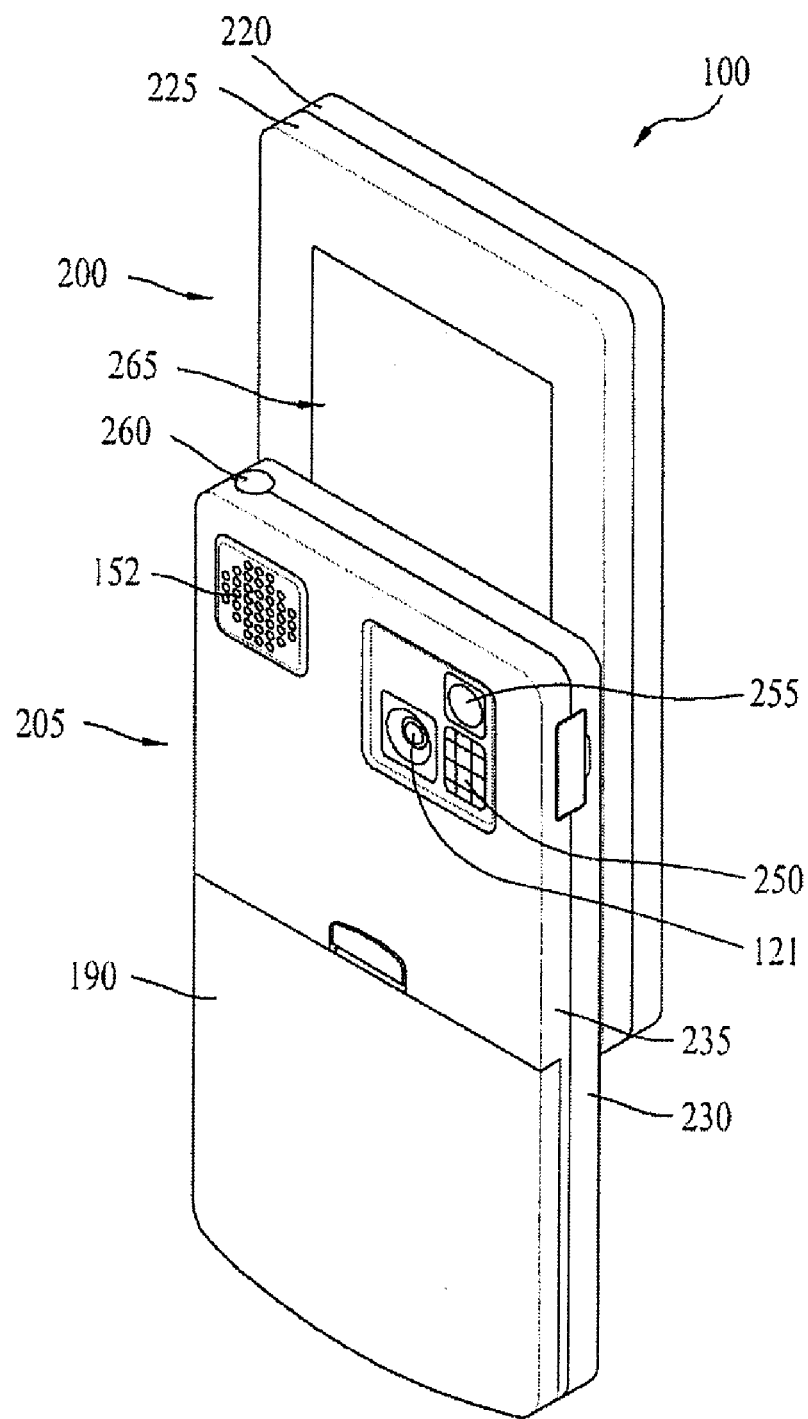
FIG. 3 is a rear perspective diagram of the mobile terminal shown in FIG. 2.

Next, FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121, and the mirror 255 is useful for assisting a user to position the camera 121 in a self-portrait mode. In addition, the camera 121 of the second body 205 faces a direction which is opposite to a direction faced by the camera 121 of the first body 200 (FIG. 2). Each of the cameras 121 of the first body 200 and second body 205 may also have the same or different capabilities.

In addition, in one embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is also useful for obtaining higher quality pictures for later use or for communicating with other parties.

Further, the second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is also shown located at an upper end of the second body 205. The antenna 260 functions in cooperation with the broadcast receiving module 111 (FIG. 1). The antenna 260 may be fixed or configured to retract into the second body 205. In addition, the rear side of the first body 200 includes a slide module 265, which slidably couples with a corresponding slide module located on the front side of the second body 205.

Also, the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

In the following description, a configuration for providing the projector module 155 to the slider type mobile terminal 100 will be explained with reference to FIGS. 4A and 4B, which are perspective diagrams of a mobile terminal according to another embodiment of the present invention. Similar reference numerals will be used in this embodiment as that described above where appropriate.

Figure 4A:
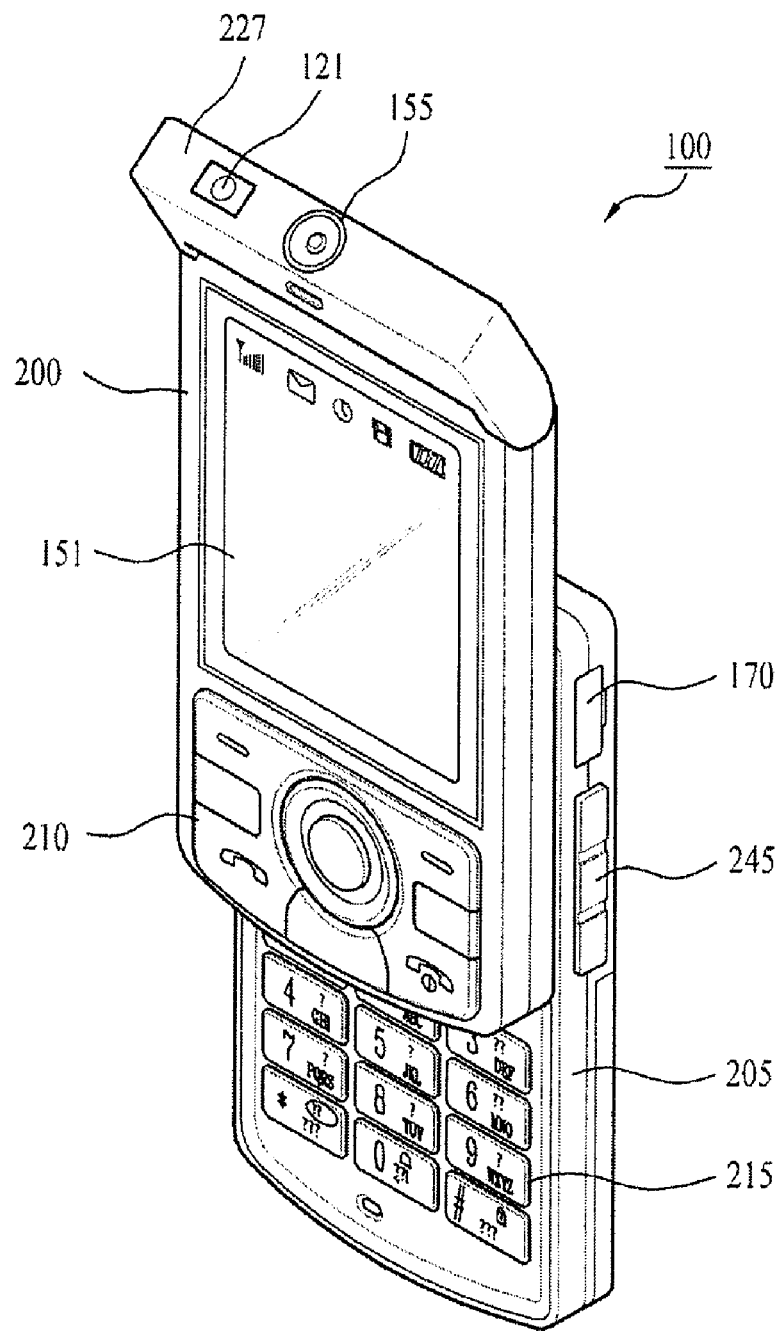
FIGS. 4A and 4B are perspective diagrams of a mobile terminal according to another embodiment of the present invention.
Figure 4B:
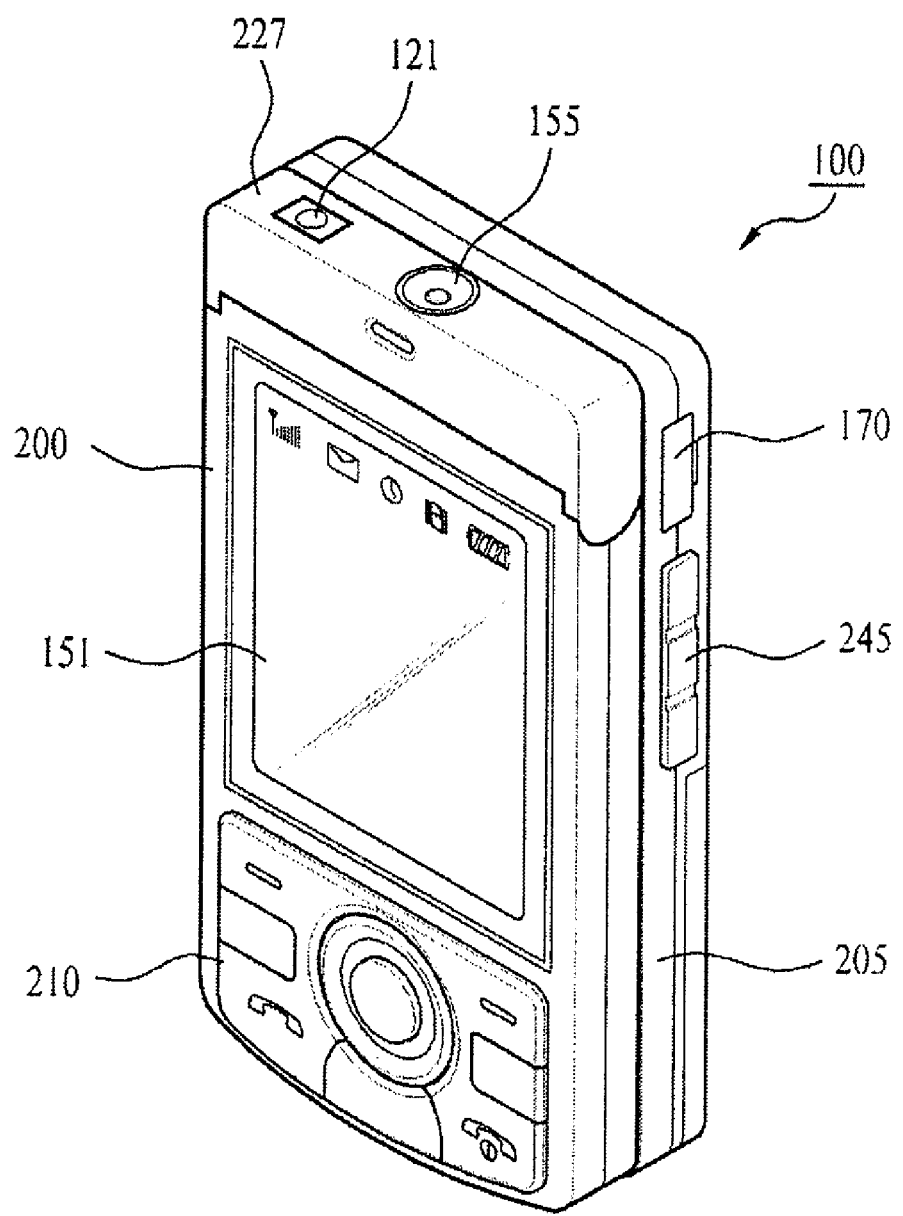

Referring to FIGS. 4A and 4B, the mobile terminal 100 includes a projector body 227 having the projector module 155 rotatably assembled to the first body 200 including the display unit 151. As mentioned in the foregoing description, the second body 205 can be assembled to the first body 200 in a manner of sliding relative to the first body 200.

Referring to FIG. 4A, while the second body 205, which is assembled to the first body 200 to slide relative thereto, is in the opened position, the projector body 227 rotatably assembled to the first body 200 is rotated. The projector body 227 can be hinged to the first body 200, and thus can adjust a projection angle of the projector body 227 when projecting a picture or image using the projector 155 provided to the projector body 227. Further, the camera 121 can be provided to the projector body 227 to photograph the image or picture projected by the projector 155.

Referring to FIG. 4B, the first and second bodies 200 and 205 shown in FIG. 4A return to the closed position and the projector body 227 also return to an original position. Therefore, if the mobile terminal 100 is carried by a user, a size of the mobile terminal 100 is minimized making it easier for the user to carry the mobile terminal. Also, in order for the projector body 227 not to interfere with the sliding motion between the first and second bodies 200 and 205, a rotation angle of the projector body 227 can be limited to enable the first body 200 to only rotate in an upper direction of the first body 200.

The projector module 155 is applicable to the bar type mobile terminal as well. This will now be explained with reference to FIGS. 5A and 5B, which are perspective diagrams of a mobile terminal 100 according to yet another embodiment of the present invention. The same references numerals will again be used in this description where appropriate.

Figure 5A:
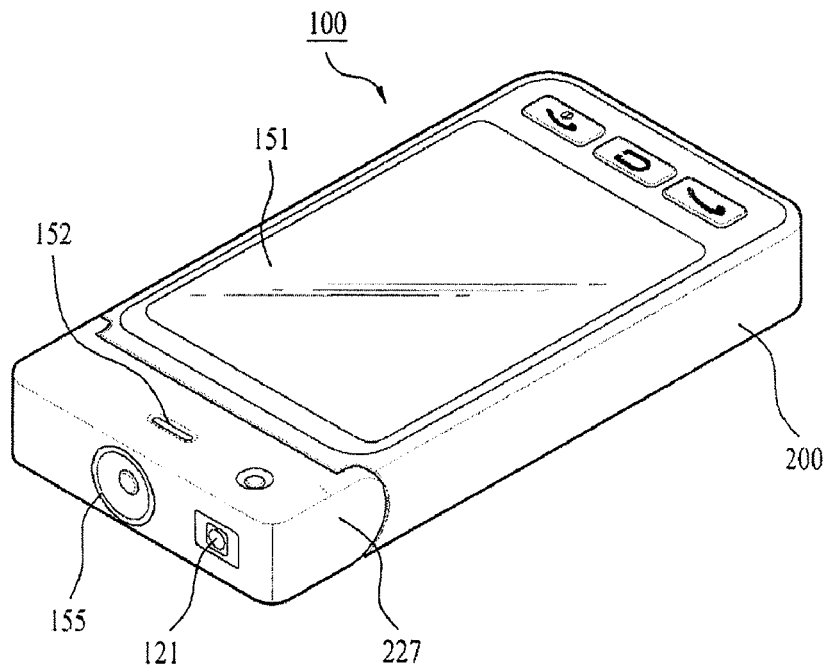
FIGS. 5A and 5B are perspective diagrams of a mobile terminal according to yet another embodiment of the present invention.
Figure 5B:
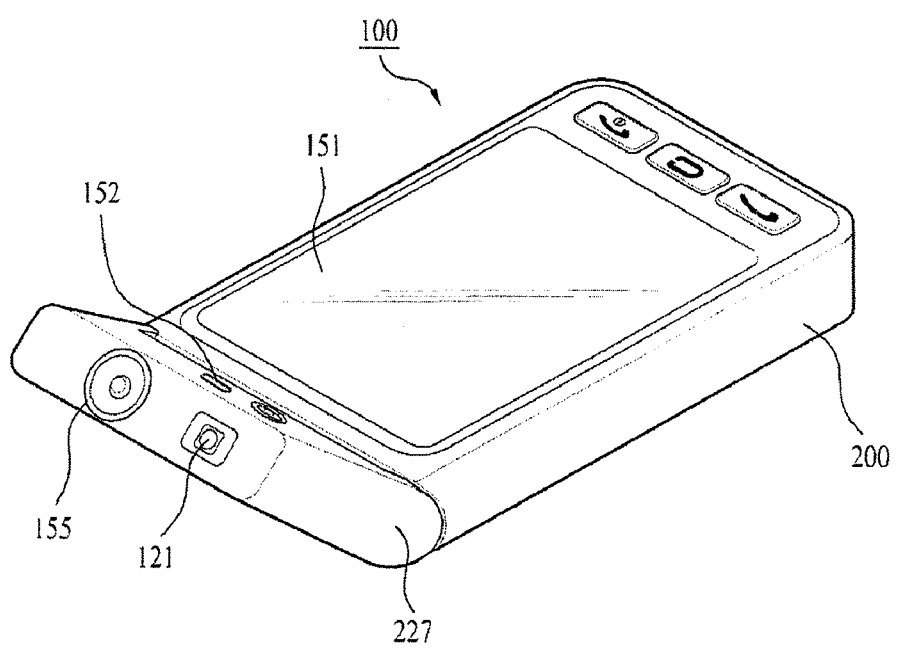

Referring to FIGS. 5A and 5B, the projector body 227 is rotatably assembled to the main body 200 of the mobile terminal. In particular, as mentioned in the above description, the projector body 227 can be hinged to the main body 200, and thus can adjust a projection angle of the projector body 227 when projecting a picture or image using the projector module 155 provided to the projector body 227. Further, the camera 121 can be provided to the projector body 227 to photograph the image or picture projected by the projector module 155. FIG. 5A shows a configuration before the projector body 227 rotatably assembled to the first body 200 is rotated, and FIG. 5B shows a configuration after the projector body 227 has been rotated.

In the following description, a control method applicable to the above-configured mobile terminal 100 is explained with respect to various embodiments. In addition, the following embodiments can be implemented independently or through combinations thereof. Further, the following embodiments can be implemented more easily if the display 151 includes a touchscreen. However, the following embodiments can be implemented by a manipulation of the user input unit 130 when the display 151 does not include the touchscreen. In the following description, a display screen of the touchscreen 151 will be indicated by a reference number '400'.

First Embodiment

Figure 6:
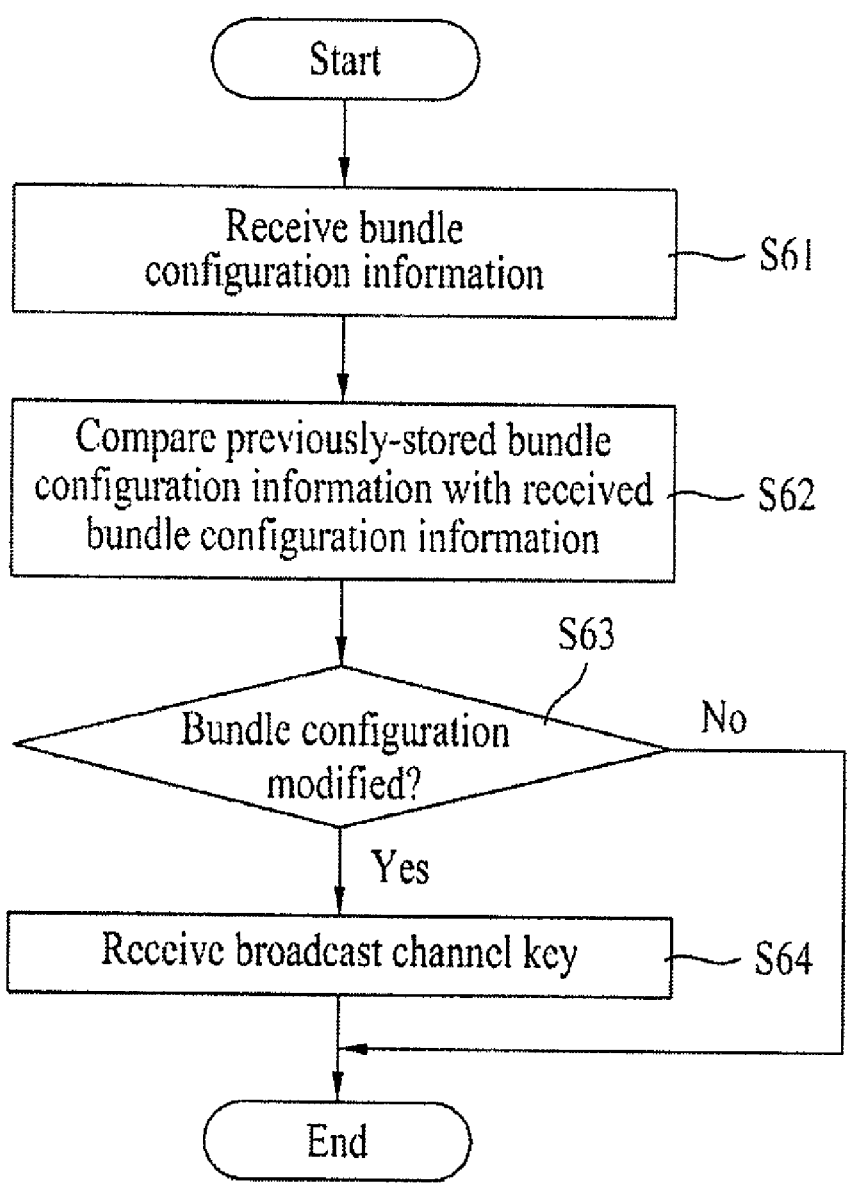
FIG. 6 is a flowchart illustrating a method of controlling a mobile terminal according to a first embodiment of the present invention.
Figure 7:
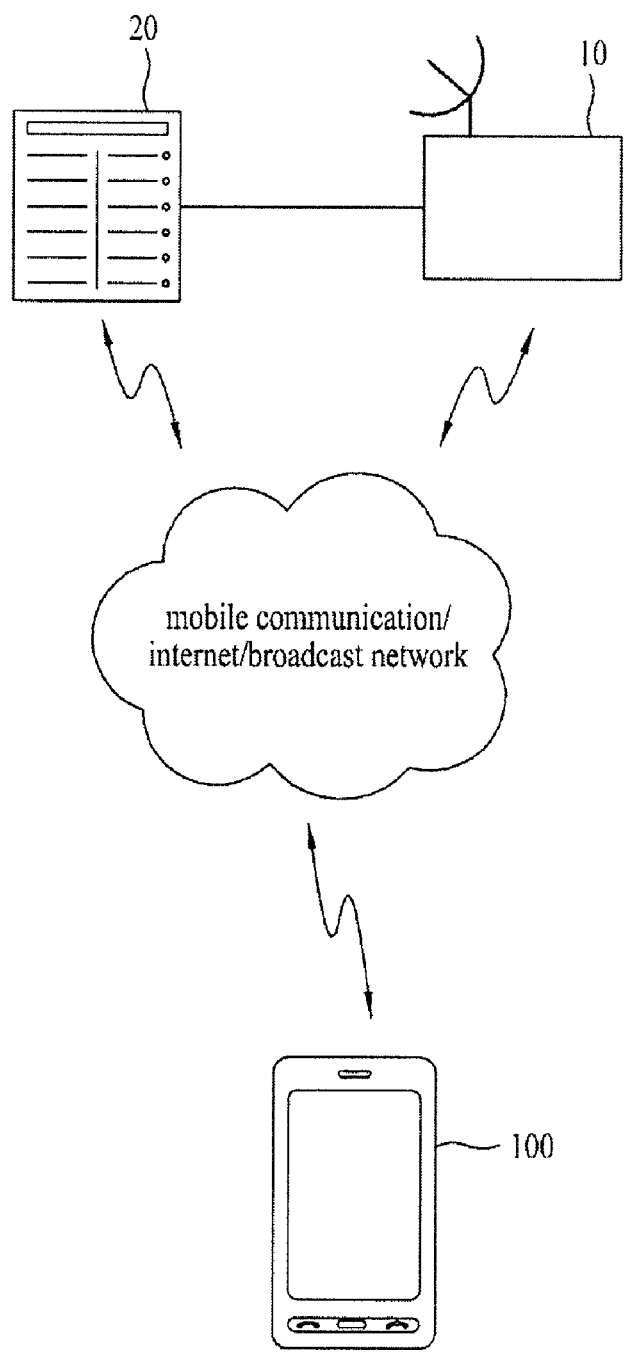
FIG. 7 is an overview of a system implementing a method of controlling a mobile terminal according to the first embodiment of the present invention.

A method of controlling a mobile terminal according to a first embodiment of the present invention will now be explained with reference to FIGS. 6 to 14. In particular, FIG. 6 is a flowchart illustrating a method of controlling a mobile terminal according to the first embodiment of the present invention, FIG. 7 is a diagram illustrating a system capable of implementing the method of controlling a mobile terminal according to the first embodiment of the present invention, FIG. 8 is a diagram illustrating an example of broadcast channel configuration applicable to the method of controlling a mobile terminal according to the first embodiment of the present invention, and FIGS. 9 to 14 are overviews of display screens on which a method of controlling a mobile terminal according to the first embodiment of the present invention is implemented.

A system capable of implementing a method of controlling a mobile terminal according to the first embodiment of the present invention will first be explained with reference to FIG. 7. As shown, a broadcast server 10 provides the mobile terminal 100 with a plurality of broadcast channels. In addition, the broadcast channels can be provided via the Internet or broadcast network. When the broadcast channels are provided via the Internet network, the mobile terminal 100 can receive the broadcast channels using a streaming method. In the following description, a broadcast provided via the Internet network will be called an 'Internet network broadcast' and a broadcast provided via the broadcast network will be called a 'broadcast network broadcast'.

The provided broadcast channels can also be classified into pay broadcast channels and free broadcast channels. In order to make the mobile terminal 100 to receive the free broadcast channels at any time, the broadcast server 10 can avoid performing an encryption processing on the free broadcast channels. However, the broadcast server 10 performs a specific encryption processing on the pay broadcast channels. Therefore, if a terminal user attempts to view the pay broadcast channel, the terminal user subscribes for a pay broadcast channel service, obtains a key for decrypting the encrypted pay broadcast channel, and then stores the obtained key in their mobile terminal.

In addition, some of the provided broadcast channels are tied together in a package type and are provided as a bundle. The broadcast channels belonging to the bundle can include the pay broadcast channels only or a combination of the pay and free broadcast channels. In the following description, the broadcast channels belonging to the bundle are assumed to include only the pay broadcast channels.

After a terminal user has subscribed for the pay broadcast channel service or the broadcast channel bundle service, a process for receiving a key is performed as follows. First, the mobile terminal 100 accesses a broadcast subscriber managing server 20 via a mobile communication network, an Internet network or a broadcast network. The mobile terminal 100 then applies for a subscription of a specific pay broadcast channel or a broadcast channel bundle service to the broadcast subscriber managing server 20. The terminal user can also pay a corresponding fee through a suitable method.

If so, the mobile terminal 100 receives a key for the pay broadcast channel or broadcast channels of the broadcast channel bundle from the broadcast subscriber managing server 20 and then stores the received key in the memory 160. An example for a configuration of the broadcast channels will now be explained with reference to FIG. 8.

Referring to (8-1) of FIG. 8, channel 1 (Ch1) to channel 10 (Ch 10) are tied into a bundle. If a terminal user makes a request for the broadcast channel bundle to the broadcast subscriber managing server 20, the mobile terminal 100 receives a key for all channels Ch1 to Ch 10 to enable the terminal user to view all broadcasts of the channels Ch1 to Ch10.

In the example in FIG. (8-1), there are two pay broadcast channels (i.e., channel 11 (Ch 11) and channel 12 (Ch 12)) and two free broadcast channels (i.e., channel 13 (Ch 13) and channel 14 (Ch 14)) in addition to the broadcast channel bundle. However, the key received by the mobile terminal 100 may not stay valid for the broadcast channel bundle, because the broadcast subscriber managing server 20 can change the key periodically or non-periodically to prevent an illegal copying of the key or for other reasons.

Moreover, the broadcast subscriber managing server 20 can change a configuration of the broadcast channel bundle. For instance, referring to (8-2) of FIG. 8, the broadcast channel (Ch 11) which used not to belong to the broadcast channel bundle can be newly added to the broadcast channel bundle. In this instance, the mobile terminal 100 needs to newly receive a key for the added broadcast channel (Ch 11). When the broadcast subscriber managing server 20 provides the key for the added broadcast channel, the broadcast subscriber managing server 20 can also change the key for the previous broadcast channels.

Referring to (8-3) of FIG. 8, the broadcast channel (Ch 10) that used to belong to the broadcast channel bundle is removed from the broadcast channel bundle. In this instance, the broadcast subscriber managing server 20 changes the key for the removed broadcast channel to prohibit the mobile terminal 100 from performing a decryption procedure with the previous key for the removed broadcast channel. When the broadcast subscriber managing server 20 changes the key for the removed broadcast channel, the broadcast subscriber managing server 20 can change the key for the rest of the broadcast channels remaining in the bundle.

Thus, when the key is changed or added, the mobile terminal 100 needs to newly receive the changed or added key. This will now be explained with reference to FIG. 9. Referring to (9-1) of FIG. 9, an image in a standby mode is displayed on the touchscreen 400 of the mobile terminal 100. Then, if a broadcast menu icon 410 displayed on the touchscreen 400 is touched, the mobile terminal 100 enters a corresponding broadcast menu. Further, the mobile terminal 100 can also enter the broadcast menu through a proper key manipulation of the user input unit 130.

Figure 9:
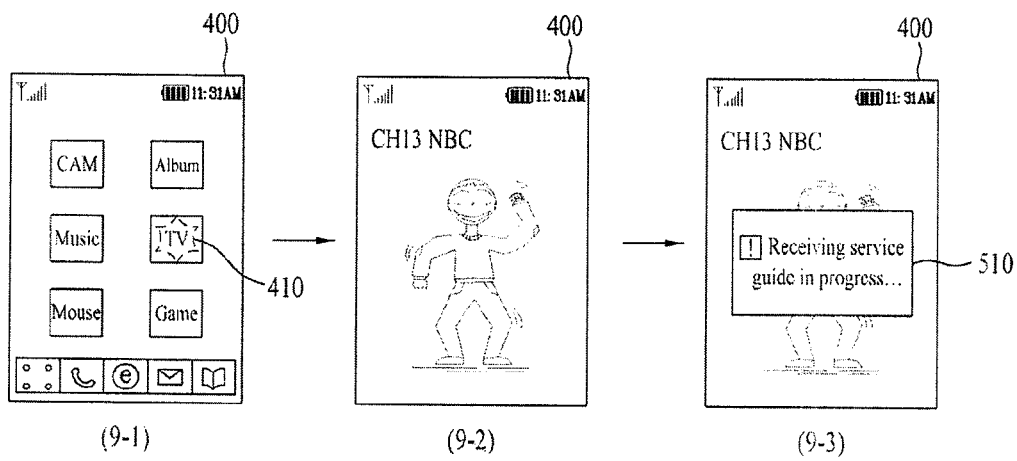

Referring to (9-2) of FIG. 9, the mobile terminal 100 receives one broadcast channel (e.g., channel 13) and then displays the received broadcast channel on the touchscreen 400. Once the mobile terminal 100 enters the broadcast menu, the mobile terminal 100 receives a service guide and can store the received service guide in the memory 160 (S61 in FIG. 6). Further, the mobile terminal 100 can manually receive the service guide when a terminal user properly makes a key manipulation of the user input unit 130. Optionally, the mobile terminal 100 can automatically receive the service guide when the mobile terminal 100 enters the broadcast menu.

If necessary, referring to (9-3) of FIG. 9, the reception of the service guide can be displayed as a popup window 510 on the touchscreen 400, for example. Broadcast channel configuration information of the broadcast channel bundle (hereinafter named 'bundle configuration information') can be included in the service guide. If so, the mobile terminal 100 receives the service guide and then compares new bundle configuration included in the received service guide with old bundle configuration information included in the former service guide stored in the memory 160 (S62).

In addition, if the new bundle configuration information is equal to the old bundle configuration information, the mobile terminal 100 need not update the key for the broadcast channel bundle. However, if the new bundle configuration information is not equal to the old bundle configuration information, the mobile terminal 100 needs to update the key for the broadcast channel bundle.

Hence, the mobile terminal 100 accesses the broadcast subscriber managing server 20, receives a new key for the broadcast channel bundle, and then updates the old key for the broadcast channel bundle stored in the memory 130 (S63 and S64). In this instance, the new bundle configuration information can be stored in the memory 160 together with or separately from the service guide.

Figure 10:
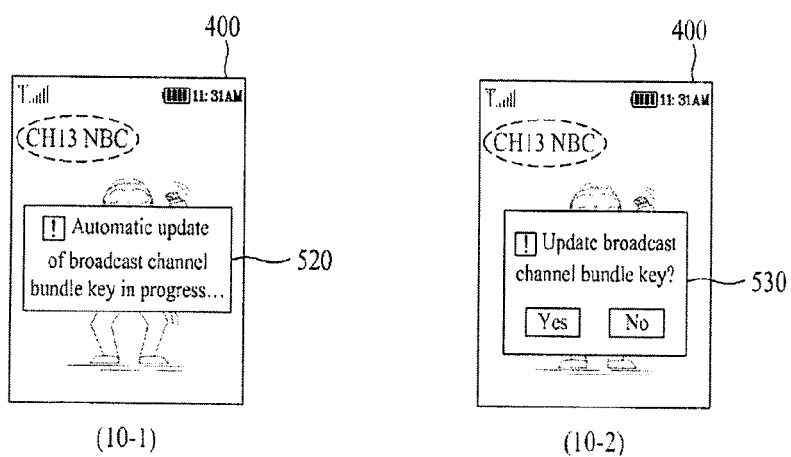
Figure 11:
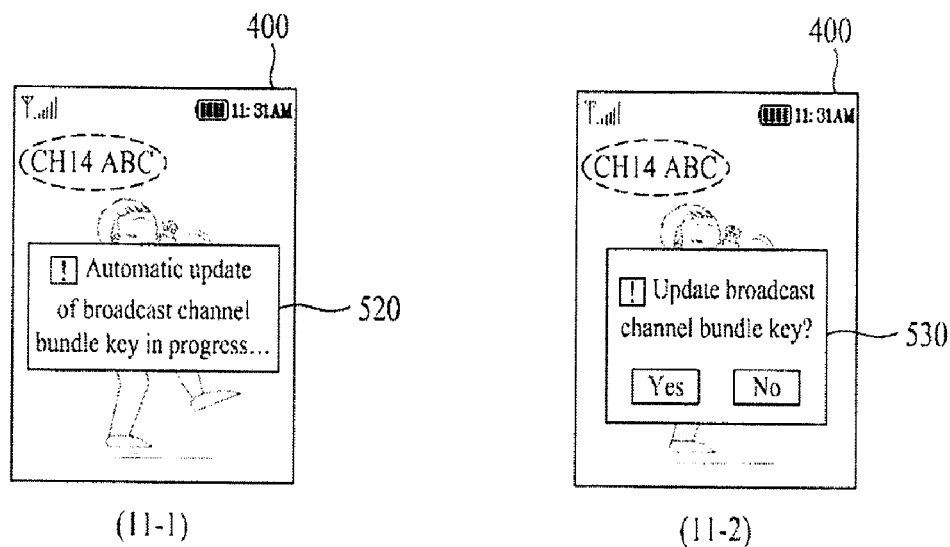

Referring to (10-1) of FIG. 10, the key update of the broadcast channel bundle can be automatically performed when the mobile terminal 100 enters a broadcast menu. Further, the key update can be performed before a current broadcast channel is switched to another random channel. In doing so, the mobile terminal 100 can inform a user that the key is being automatically updated through a popup window 520 as shown in (10-1) of FIG. 10. In addition, the popup window 520 is an optional configuration.

Referring to (10-2) of FIG. 10, the mobile terminal 100 can also display a popup window 520 for querying whether to update the key. When a terminal user attempts to update the key manually through the popup window 530, the mobile terminal 100 can update the key. Also, the key update of the broadcast channel bundle, as shown in (11-1) and (11-2) of FIG. 11, can be performed when a current broadcast channel (i.e., channel 13) is switched to another random channel (e.g., channel 14). Referring to (11-1) of FIG. 11, the key update is being performed automatically, and referring to (11-2) of FIG. 11, the key update is being performed manually. The key update process was explained with reference to FIG. 10.

Figure 12:
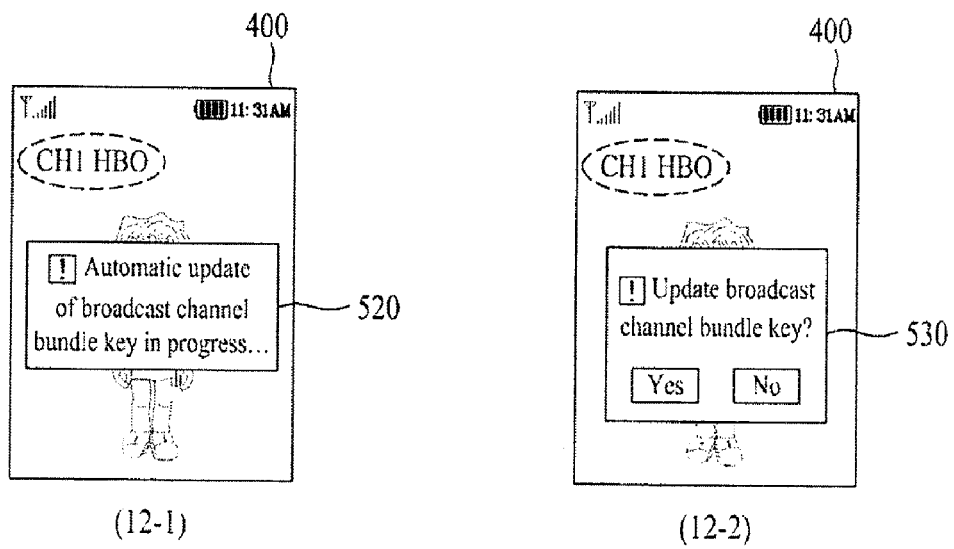

Moreover, the key update process of the broadcast channel bundle, as shown in (12-1) and (12-2) of FIG. 12, can be performed when the current broadcast channel (i.e., channel 13) is switched to one (e.g., channel 1) of the channels belonging to the broadcast channel bundle. The broadcast channel can also be switched through a proper manipulation of the user input unit. Referring to (12-1) of FIG. 12, the key update is being performed automatically, and referring to (12-2) of FIG. 12, the key update is being performed manually.

A process for displaying the received service guide in the mobile terminal 100 will now be explained with reference to FIG. 13. Referring to (13-1) of FIG. 13, the mobile terminal 100 displays the received service guide 600. As shown, in the service guide 600, channel 1 to channel 10 correspond to the broadcast channel bundle, which is indicated by a sign 'B'. Further, in the service guide 600, channel 11 and channel 12 are pay broadcast channels, which is indicated by a sign 'P'. Alternatively, channel 1 to channel 10 can be represented in a specific color to indicate that they belong to the broadcast channel bundle instead of being indicated by the sign 'B'. Also, channel 11 and channel 12 can be represented in a specific color to indicate that they are pay broadcast channels.

Figure 13:
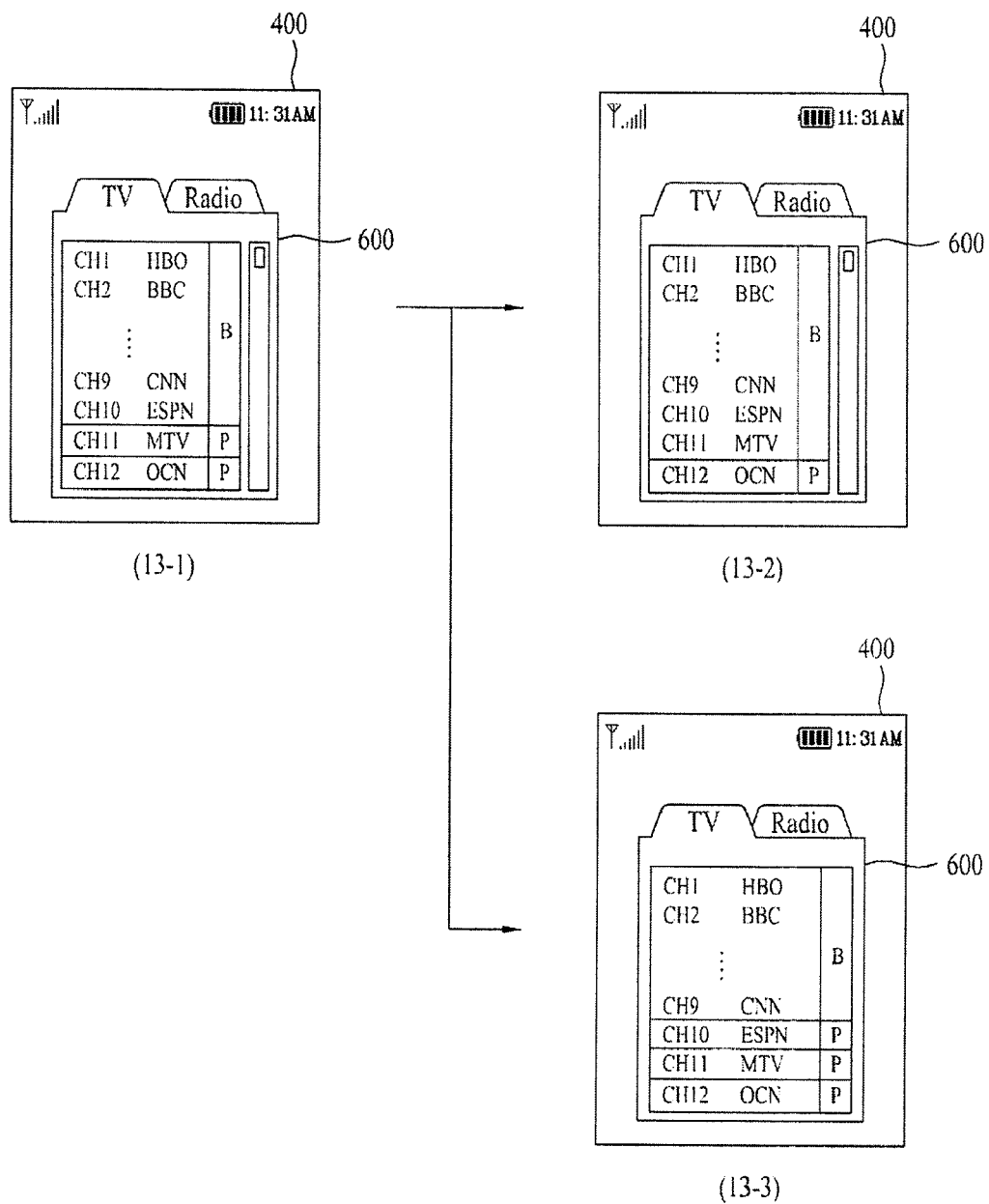

Referring to (13-2) and (13-3) of FIG. 13, a configuration of the broadcast channel bundle can be modified. (13-2) of FIG. 13 shows the channel 11 is newly added to the broadcast channel bundle, and (13-3) of FIG. 13 shows channel 10 is removed from the broadcast channel bundle. In addition, referring to (13-2) of FIG. 13, channel 11 is newly added to the broadcast channel bundle, which is represented as the sign 'B', referring to (13-3) of FIG. 13, channel 10 is removed from the broadcast channel bundle, which is represented as the sign 'P'. Alternatively, channel 11 can be represented in a specific color to indicate that it belongs to the broadcast channel bundle, and channel 10 can be represented in a different specific color to indicate that it is removed from the broadcast channel bundle.

A process for switching a current broadcast channel to a pay broadcast channel (e.g., channel 12 or channel 10 shown in (13-3) of FIG. 13) in the mobile terminal 100 will now be explained with reference to FIG. 14. Referring to (14-1) and (14-2) of FIG. 14, a channel switching operation to another pay broadcast channel (channel 12) from a current broadcast channel (e.g., channel 13) can be performed by the mobile terminal 100.

If the channel switching is performed, the mobile terminal 100 can display a popup window 540 for informing the user that the channel-switched broadcast channel is a pay channel. In addition, a terminal user can decide whether to purchase the pay broadcast channel through the popup window 540. Alternatively, referring to (14-1) and (14-3) of FIG. 14, a channel switching operation can be performed from a current broadcast channel (e.g., channel 13) to a pay broadcast channel (e.g., channel 10 shown in (13-3) of FIG. 13), which becomes chargeable by being removed from the broadcast channel bundle, in the mobile terminal 100.

If the channel switching is performed, the mobile terminal 100 can display a popup window 550 for informing the user that the channel-switched broadcast channel is a pay channel that becomes chargeable by being removed from the broadcast channel bundle. Thus, a terminal user can decide whether to purchase the pay broadcast channel through the popup window 550. In the above description, a process for updating a key of a broadcast channel bundle is explained for the mobile terminal 100 comparing new bundle configuration information provided through a service guide with old bundle configuration information previously received and stored in the memory 160.

However, the present invention is non-limited by this process. For instance, the service guide can be provided by including bundle configuration modification information indicating that the configuration of the broadcast channel bundle has been modified, for example. Alternatively, although the configuration of the broadcast channel bundle is not modified, when the broadcast subscriber managing server changes a key of the bundle, the service guide can be provided by including bundle key change information indicating that a key of the broadcast channel bundle has been changed. Therefore, if the bundle configuration modification information or the bundle key change information is included in the service guide, the mobile terminal 100 can update the key of the bundle by accessing the broadcast subscriber managing server directly without a separate comparing procedure.

In the following description, the bundle configuration modification information being included in the service guide will be explained in more detail with reference to FIG. 15, which is a diagram illustrating XML (extensible markup language) of a service guide according to the OMA-BCAST system. Referring to FIG. 15, the mobile terminal 100 can receive the bundle configuration modification information through the service guide using a field extension of a service guide structure. The field extension is possible using a 'PrivateExt' field of the service guide, which is a field defined for a future use or application-specific extension. Thus, an existing broadcast application is not affected using the 'PrivateExt' field.

In addition, the service guide having been updated can be indicated through an 'Update' field of the 'PrivateExt' field. A version of the updated service guide can also be represented as a 'Version' field. Moreover, using the 'FragmentType' field can indicate which part of the service guide has been updated. For instance, the 'FragmentType' being set to 1 can indicate that a broadcast channel is switched, the 'FragmentType' being set to 2 can indicate that a broadcast program is changed, the 'FragmentType' being set to 5 can indicate that a broadcast channel bundle is modified, and the 'FragmentType' being set to 6 can indicate that broadcast purchase information is modified.

The service guide being updated can be indicated by sing the 'UpdatedType' filed. For instance, the 'UpdatedType' being set to 0 can indicate that a channel is added, the 'UpdatedType' being set to 1 can indicate that a channel is deleted, and the 'UpdatedType' being set to 2 can indicate that a channel is changed. Further, the 'id' field can be used to indicate a channel to be changed.

Next, FIG. 16 is a diagram illustrating XML codes written according to the scheme of XML (extensible markup language) of the service guide shown in FIG. 15. Referring to FIG. 16, the XML code indicates that a version of the service guide is '1.0', indicates that 'channel 11' is added through the service guide, and also indicates that configuration information of a broadcast channel bundle is modified to delete 'channel 10' from the bundle.

Therefore, the mobile terminal 100 can update a corresponding key by accessing the broadcast subscriber managing server when receiving the bundle configuration modification information via the service guide. The process for updating the key of the bundle was explained above. Meanwhile, it is not mandatory for the bundle configuration modification information to be provided to the mobile terminal via the service guide only. Alternatively, for instance, whenever the broadcast subscriber managing server provides the mobile terminal 100 with a message (e.g., a short text message, a multimedia message, an e-mail message, etc.) containing the bundle configuration modification information, if necessary, the mobile terminal 100 can update the key of the bundle.

Second Embodiment

The above-described first embodiment relates to a method of determining whether a key update of a broadcast channel bundle needs to be performed by comparing bundle configuration information or referring to bundle configuration modification information or bundle key change information after receiving a service guide. In the following description, the second embodiment of the present invention relates to a method of enabling a mobile terminal to determine whether to perform a key update for a broadcast channel bundle without using a service guide.

A method of controlling a mobile terminal according to a second embodiment of the present invention will now be explained with reference to FIGS. 17 and 18. In particular, FIG. 17 is a flowchart illustrating a method of controlling a mobile terminal according to the second embodiment of the present invention, and FIG. 18 is an overview of display screens on which a method of controlling a mobile terminal according to the second embodiment of the present invention is implemented.

Figure 17:
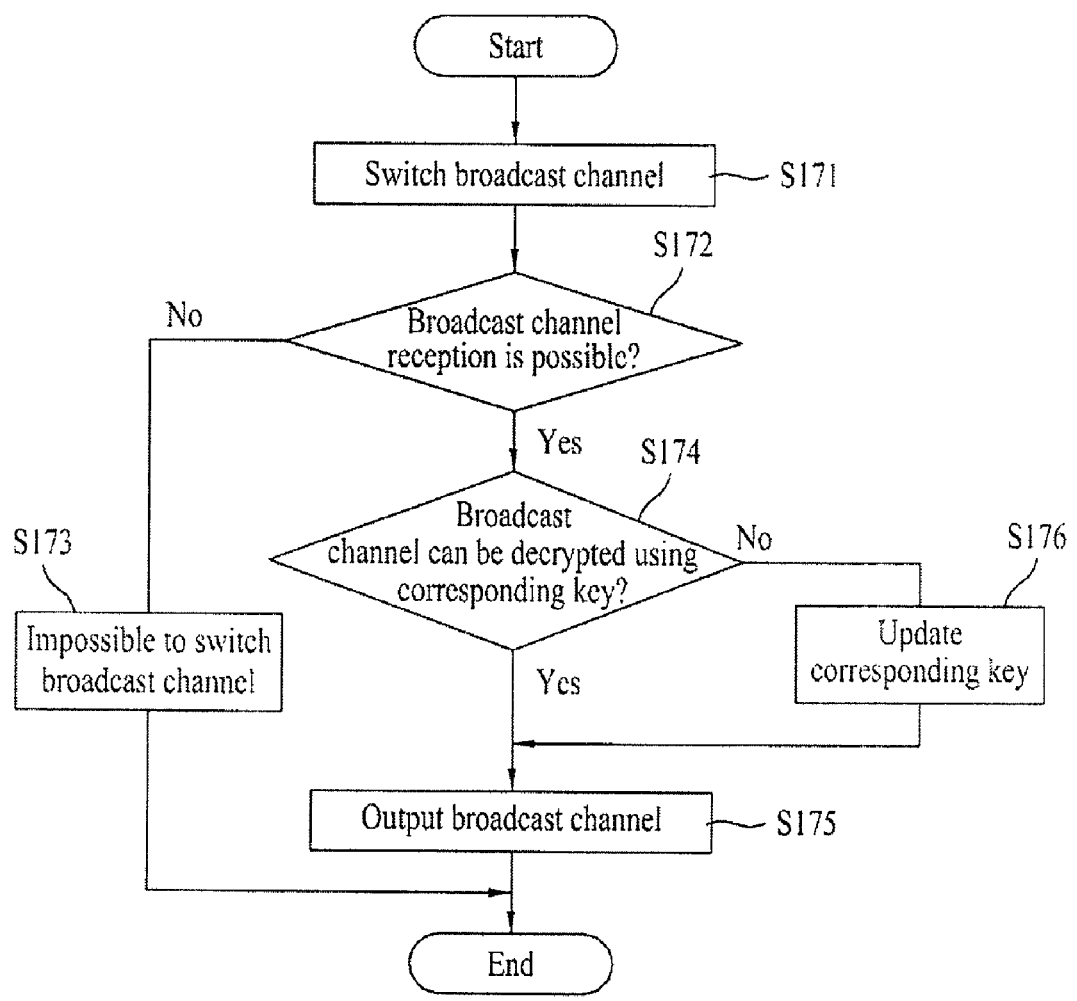
FIG. 17 is a flowchart illustrating a method of controlling a mobile terminal according to a second embodiment of the present invention.

Referring to FIG. 17 and (18-1) and (18-2) of FIG. 18, a current broadcast channel (channel 13) can be randomly switched to another broadcast channel (channel 34) in the mobile terminal 100 (S171) in FIG. 17. Assuming that the broadcast server 10 provides no broadcast on channel Ch34, the mobile terminal 100 can not receive the channel 34. If so, the mobile terminal 100 can display a popup window 560 for guiding that a channel switching operation to the channel 34 is not available (S172 and S173).

Referring to FIG. 17 and (18-1), (18-3) and (18-4) of FIG. 18, the mobile terminal 100 switches the current broadcast channel (channel 13) to one (e.g., channel 1) of broadcast channels of the broadcast channel bundle (S171). Subsequently, the mobile terminal 100 determines whether the channel-switched broadcast channel (channel 1) is receivable (S172). Because the channel-switched broadcast channel is one of the channels belonging to the broadcast channel bundle, the mobile terminal 100 will be able to receive the channel-switched broadcast channel.

The mobile terminal 100 then decrypts the received broadcast channel using a key for the switched broadcast channel (S174). In this instance, the key is stored in the memory 160. If the decryption is successfully completed, the mobile terminal 100 can display the corresponding broadcast channel as shown in (18-3) of FIG. 10 (S175). Referring to FIG. 17 and (18-4) of FIG. 18, if the decryption fails, the mobile terminal 100 accesses the broadcast subscriber managing server to update a key of the channel-switched broadcast channel or keys of all broadcast channels of the broadcast channel bundle (S176). The key update was already explained in the description of the first embodiment.

Third Embodiment

The above first and second embodiments relate to a situation that a terminal user views a broadcast channel provided via a broadcast network instead of an Internet network. In the following description, a process for providing a broadcast channel to a user via an Internet network according to the third embodiment of the present invention is explained.

Figure 19:
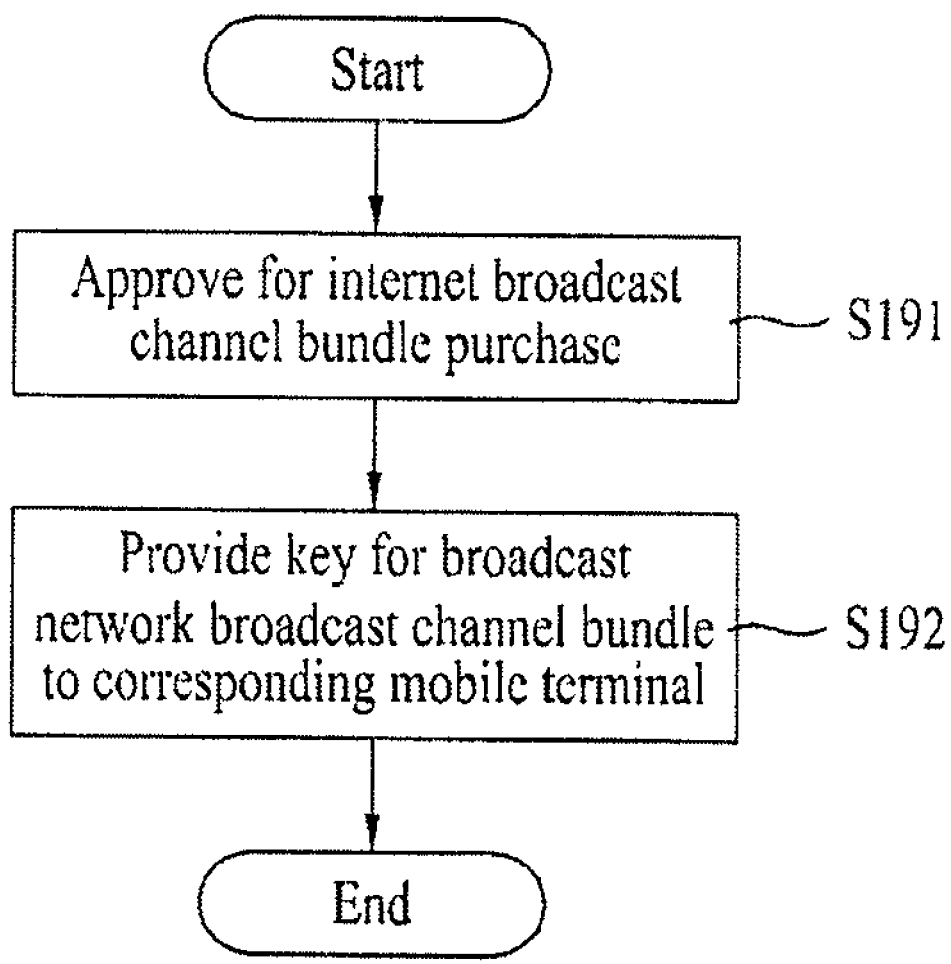
FIG. 19 is a flowchart illustrating a method of controlling a mobile terminal according to a third embodiment of the present invention.
Figure 20:
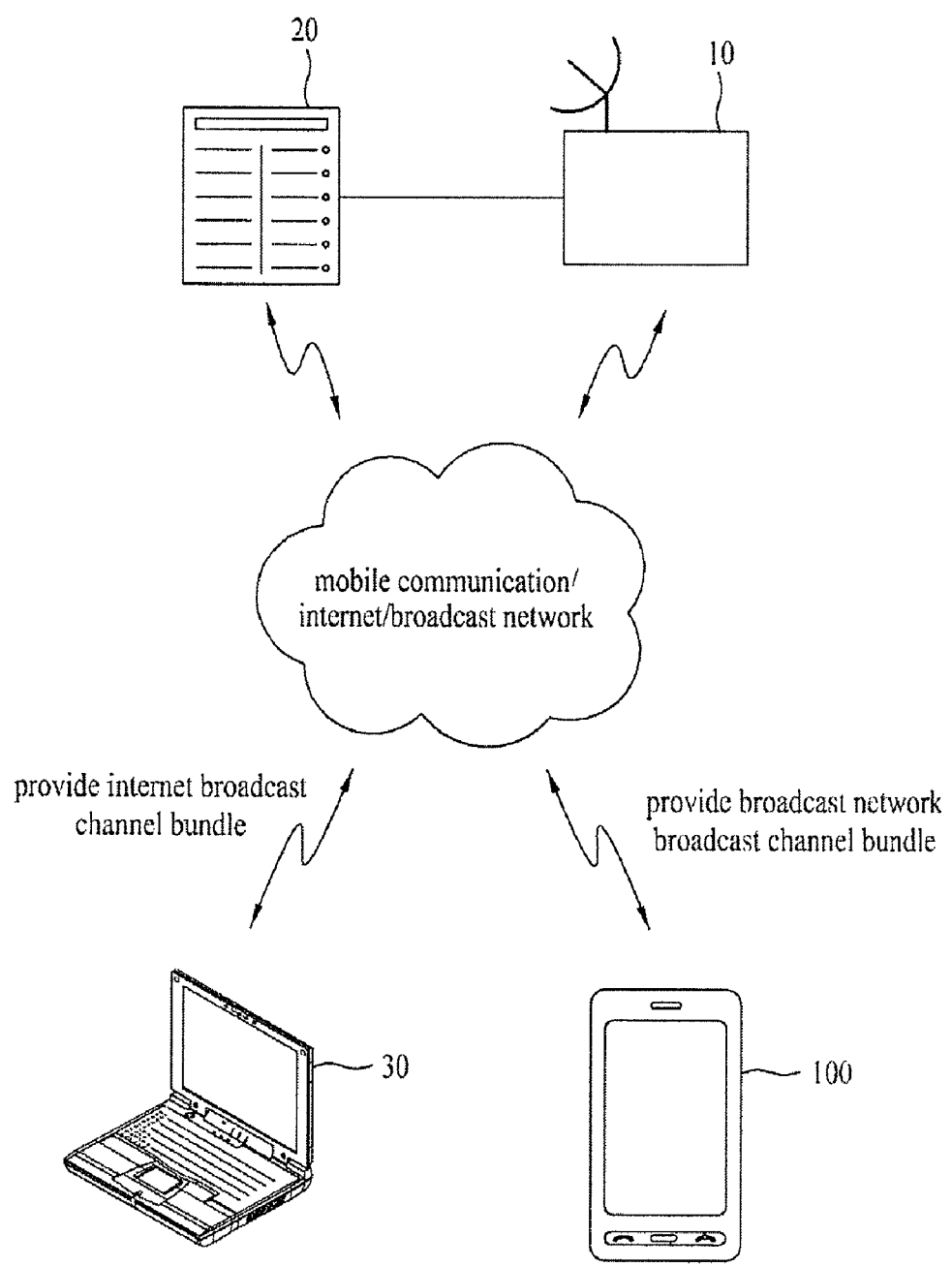
FIG. 20 is a diagram illustrating a system implementing a method of controlling a mobile terminal according to the third embodiment of the present invention.

A method of controlling a mobile terminal according to the third embodiment of the present invention will be explained with reference to FIGS. 19 and 20. In more detail, FIG. 19 is a flowchart illustrating a method of controlling a mobile terminal according to the third embodiment of the present invention, and FIG. 20 is an overview of a system capable of implementing a method of controlling a mobile terminal according to the third embodiment of the present invention.

First, a system capable of implementing a method of controlling a mobile terminal according to the third embodiment of the present invention will be explained with reference to FIG. 20. Referring to FIG. 20, the broadcast server 10 can provide the mobile terminal 100 with a plurality of broadcast channels. As mentioned in the foregoing description, the broadcast channels can be provided via an Internet or broadcast network.

The broadcast server 10 or the broadcast subscriber providing server 20 can also provide broadcast channels according to the same broadcast channel bundle via both of the Internet network and the broadcast network. In the following description, the broadcast channel bundle provided via the Internet network is called the 'Internet network broadcast channel bundle' and the broadcast channel bundle provided via the broadcast network is called the 'broadcast network broadcast channel bundle'.

In addition, a terminal user accesses the broadcast subscriber providing server 20 via the Internet network using a terminal 30 capable of wire/wireless Internet and can then make a request for purchase of the Internet network broadcast channel bundle (or a single pay broadcast channel) (S191). Because the mobile terminal 100 can access the wireless Internet, the terminal user accesses the broadcast subscriber managing server via the wireless Internet using the mobile terminal 100 and can then make a request for the Internet network broadcast channel bundle.

In this instance, when the terminal user purchases the broadcast network broadcast channel bundle (or a single pay broadcast channel), the broadcast network broadcast channel bundle is set to be usable by the mobile terminal of the terminal user. That is, various schemes can be considered for providing a key for the broadcast network broadcast channel bundle to the mobile terminal (S192).

In the first scheme, the terminal user directly accesses the broadcast subscriber providing server 20 using the mobile terminal 100 of the terminal user and then downloads a key for the broadcast channel bundle. In the second scheme, when the terminal user purchases the Internet network broadcast channel bundle, the key of the broadcast channel bundle can be provided by being contained in a response message provided to the terminal 30 (or the mobile terminal 100) in order to announce that a purchase of the Internet network broadcast channel bundle has been approved. Alternatively, a message containing the key (e.g., short text message, multimedia message, e-mail message, etc.) can be provided to the terminal 30 or the mobile terminal 100. This is further explained with reference to FIG. 21.

In particular, FIG. 21 is a diagram illustrating XML (extensible markup language) of a message for a purchase of an Internet broadcast channel bundle. Referring to FIG. 21, a purchased channel can be specified via the 'ServiceId' field, and a service encryption key (SEK) for the purchased channel can be delivered via a 'LTKM (long term key message)' field.

Next, FIG. 22 is a diagram illustrating XML codes written according to the XML (extensible markup language) of the message shown in FIG. 21. Referring to FIG. 22, the XML code shows that keys of channel 5, channel 6, channel 7 and channel 8 are contained in the message. In the third scheme, when the terminal user purchases the Internet network broadcast channel bundle, the broadcast subscriber providing server 20 can provide the mobile terminal 100 with a message (e.g., short text message, multimedia message, e-mail message, etc.) for announcing to download the key for the broadcast channel bundle using information (e.g., phone number of the mobile terminal 100 of the terminal user) registered when the terminal user subscribes for the Internet network broadcast channel bundle.

When the message is received, the mobile terminal automatically or manually accesses the broadcast subscriber providing server 20 and can then download the key. This will be explained with reference to FIG. 23. In particular, FIG. 23 is a diagram illustrating XML (extensible markup language) of a message for a purchase approval for an Internet broadcast channel bundle. Referring to FIG. 23, according to the scheme, the key download necessity can be announced in the mobile terminal via the 'ServiceKeyUpdated' field. Further, a purchased channel can be specified via the 'ServiceId' field.

Accordingly, embodiments of the present invention provide several advantages. For example, a terminal user is facilitated to view a specific one of a plurality of broadcast channels received by a mobile terminal.

Further, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include transmission via Internet. The computer can also include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display device;
   a user input device;
   a wireless communication device configured to receive bundle configuration information of a prescribed broadcast channel bundle; and
   a control device configured to determine whether a configuration of the prescribed broadcast channel bundle is modified using the bundle configuration information, and to receive a key for broadcast channels of the configuration-modified broadcast channel bundle if the configuration of the broadcast channel bundle is modified.

2. The mobile terminal of claim 1, further comprising:
   a memory device configured to store the bundle configuration information,
   wherein the control device is further configured to determine whether the configuration of the broadcast channel bundle is modified by comparing the bundle configuration information stored in the memory device with the received bundle configuration information.

3. The mobile terminal of claim 1, wherein the control device is further configured to receive the key by accessing an external server via the wireless communication device.

4. The mobile terminal of claim 1, wherein the bundle configuration information is included in broadcast associated information.

5. The mobile terminal of claim 4, wherein the broadcast associated information includes at least one of a program guide and a service guide.

6. The mobile terminal of claim 1, wherein the control device is further configured to receive the key for the broadcast channels of the broadcast channel bundle entirely or in part.

7. The mobile terminal of claim 1, wherein the control device is further configured to output an alarm to announce that the configuration of the broadcast channel bundle is modified.

8. The mobile terminal of claim 7, wherein the control device is further configured to output the alarm when a broadcast menu is entered or a broadcast channel is switched after entering the broadcast menu.

9. The mobile terminal of claim 7, wherein the control device is further configured to receive the key if a prescribed command is input via the user input device.

10. The mobile terminal of claim 1, wherein the control device is further configured to visually discriminately display at least one of two broadcast channels on a broadcast channel list, one of the two broadcast channels failing to belong to the broadcast channel bundle and the other of the two broadcasts newly belonging to the broadcast channel bundle.

11. The mobile terminal of claim 1, wherein if a channel is switched to a pay broadcast channel failing to belong to the broadcast channel bundle via the input device, the control device is further configured to display on the display device a window for querying whether to purchase the pay broadcast channel.

12. The mobile terminal of claim 1, wherein the bundle configuration modification information is received via a message or broadcast associated information.

13. The mobile terminal of claim 1, wherein when a channel is switched to a random broadcast channel and the switched broadcast channel is received but is not decrypted, the control device is further configured to receive a key for the switched broadcast channel via the wireless communication device.

14. The mobile terminal of claim 13, wherein upon receiving the key for the switched broadcast channel, the control device is further configured to update all keys stored in a memory device of the mobile terminal.

15. A method of controlling a mobile terminal, the method comprising:
  receiving, via a wireless communication unit, bundle configuration information of a prescribed broadcast channel bundle;
  determining, via a control unit, whether a configuration of the prescribed broadcast channel bundle is modified using the bundle configuration information; and
  receiving, via the wireless communication unit under control of the control unit, a key for broadcast channels of the configuration-modified broadcast channel bundle if the configuration of the broadcast channel bundle is modified.

16. The method of claim 15, further comprising:
  storing, in a memory unit of the mobile terminal, the bundle configuration information,
  wherein the determining step determines whether the configuration of the broadcast channel bundle is modified by comparing the bundle configuration information stored in the memory unit with the received bundle configuration information.

17. The method of claim 16, wherein the bundle configuration information is included in broadcast associated information.

18. The method of claim 16, further comprising:
  outputting an alarm to announce that the configuration of the broadcast channel bundle is modified.

19. The method of claim 18, wherein the outputting step outputs the alarm when a broadcast menu is entered or a broadcast channel is switched after entering the broadcast menu.

20. The method of claim 16, wherein the receiving step receive the key if a prescribed command is input via the user input unit.

21. The method of claim 16, further comprising:
  visually discriminately displaying at least one of two broadcast channels on a broadcast channel list, one of the two broadcast channels failing to belong to the broadcast channel bundle and the other of the two broadcasts newly belonging to the broadcast channel bundle.

22. The method of claim 16, wherein if a channel is switched to a pay broadcast channel failing to belong to the broadcast channel bundle via the input unit, the method further comprises displaying a window for querying whether to purchase the pay broadcast channel.

* * * * *